(12) United States Patent
Cheon

(10) Patent No.: US 12,227,251 B2
(45) Date of Patent: Feb. 18, 2025

(54) HARNESS PROTECTOR

(71) Applicant: Koolance, Inc., Auburn, WA (US)

(72) Inventor: Kioan Cheon, Auburn, WA (US)

(73) Assignee: Koolance, Inc., Auburn, WA (US)

( * ) Notice: Subject to any disclaimer, the term of this patent is extended or adjusted under 35 U.S.C. 154(b) by 291 days.

(21) Appl. No.: 17/827,397

(22) Filed: May 27, 2022

(65) Prior Publication Data

US 2022/0388589 A1 Dec. 8, 2022

Related U.S. Application Data

(60) Provisional application No. 63/196,541, filed on Jun. 3, 2021.

(51) Int. Cl.
*B62J 1/28* (2006.01)

(52) U.S. Cl.
CPC ........................................ *B62J 1/28* (2013.01)

(58) Field of Classification Search
CPC ... B62J 1/28; A41D 13/0537; A41D 2600/104
See application file for complete search history.

(56) References Cited

U.S. PATENT DOCUMENTS

| | | | |
|---|---|---|---|
| 4,961,233 A | 10/1990 | Black | |
| 5,271,101 A | 12/1993 | Speth et al. | |
| D503,514 S | 4/2005 | Yates | |
| 9,168,401 B2 * | 10/2015 | Botti | A62B 35/0025 |
| 9,486,654 B1 * | 11/2016 | Carpenter | A62B 35/0012 |
| 9,877,524 B1 | 1/2018 | Kaviani | |
| 10,561,866 B1 * | 2/2020 | Hinnant | A62B 35/0025 |
| 11,850,452 B2 * | 12/2023 | Power, II | A62B 35/0012 |
| 2006/0049611 A1 * | 3/2006 | Stevens | B62J 1/28 280/288.4 |
| 2009/0314578 A1 * | 12/2009 | Hede | A62B 35/0012 182/3 |
| 2015/0231422 A1 * | 8/2015 | Perner | A62B 35/0012 182/3 |
| 2016/0219950 A1 | 8/2016 | Lucchini et al. | |

* cited by examiner

*Primary Examiner* — Mark R Wendell
(74) *Attorney, Agent, or Firm* — Seed IP Law Group LLP

(57) ABSTRACT

The present disclosure is directed to embodiments of harnesses for supporting and improving comfort of a bicyclist while riding a bicycle. In at least one embodiment, the harness includes a support portion, which supports and contacts hips or a waist of the bicyclist, and a saddle contact portion, which supports and contacts a gluteus maximus (i.e., posterior, rear, butt, etc.) of the bicyclist. The saddle contact portion raises or suspends a perineum area (e.g., an area between the anus and the vulva or scrotum of an individual) of the bicyclist (i.e., rider, operator, user, etc.) above the saddle of the bicycle such that the perineum area does not contact the saddle of the bicycle while riding the bicycle. The harness is adjustable by a plurality of adjustable straps that are coupled between the support and the saddle contact portion. The harness is further adjustable by loosening a locking component interlocking with a toothed member of the support portion, which allows the support portion to be moved from various positions. The bicyclist wears the harness over their external clothing (e.g., pants, shorts, shirt, jacket, etc.).

15 Claims, 12 Drawing Sheets

HARNESS PROTECTOR

BACKGROUND

Technical Field

The present disclosure is directed to a harness to support and cushion a bicyclist while riding a bicycle.

Description of the Related Art

Support and protection for a bicyclist while riding a bicycle includes padding and cushioning, which are conventionally incorporated in/on a bicycle saddle or in/on clothing that the bicyclist may wear while riding the bicycle. The padding and cushioning may assist in providing the bicyclist with a comfortable riding experience by improving support of the bicyclist while riding the bicycle.

In particular, bicycle saddles or seats may include padding and cushioning on or in the bicycle saddle to improve comfort and support for the bicyclist while riding the bicycle. For example, the padding and cushioning may be deformable and soft (e.g., a deformable gel material, a deformable foam material, etc.). For example, when the bicyclist sits on the bicycle saddle, the bicycle saddle deforms and conforms to the bicyclist providing custom support and comfort. Furthermore, the bicycle saddles may be shaped to direct the bicyclist to a preferred position while riding the bicycle to reduce the likelihood of injuries, reduce strain, reduce pressure points, and reduce accumulation of fatigue.

Alternatively, padding or cushioning may be incorporated into clothing worn by the bicyclist that may improve comfort and support for the bicyclist while riding the bicycle. For example, padding or cushioning may be provided in pants adjacent to and around a gluteus maximus area, an internal thigh area, or a perineum area of the bicyclist to cushion and support points of contact between the bicycle saddle and the bicyclist while riding the bicycle. Similar to the deformable padding or cushioning of the bicycle saddle as discussed earlier, the padding or cushioning in the clothing may be deformable and soft of a same or similar type.

BRIEF SUMMARY

Various embodiments and implementations described herein are directed to a harness that includes cushioning and padding. The embodiments of the harness may be worn over external clothing of the bicyclist. The embodiments of the harness provide a comfortable riding experience as well as support the bicyclist while riding the bicycle, which may reduce the likelihood of injuries, pressure points, stress, and the speed at which fatigue is accumulated when the bicyclist is riding the bicycle.

By way of example, the harness includes a plurality of adjustable straps that the bicyclist may tighten and loosen to obtain a custom fit based on the bicyclist's size and shape. The harness may further include a saddle contact portion coupled to a support portion coupled to the saddle contact portion. The support portion includes a first toothed member and second toothed member each of which has a plurality of teeth. A plurality of fasteners (e.g., screws, temporary snap-fit fasteners, etc.) fasten a locking component to the saddle contact portion. The locking component interlocks with and couples the first and second toothed members to the saddle contact portion holding the support portion in a fixed or stationary position. The locking component has ends received by valleys of the pluralities of teeth of the first and second toothed members. The ends enter the valleys and interlock with peaks of the pluralities of teeth of the first and second toothed members.

By way of further example, when tightening the plurality of fasteners, the ends of the locking components lock the first and second toothed members in a first stationary position. When the plurality of fasteners are loosened, the ends of the locking component disengage with the plurality of teeth of the first and second toothed members, and the first and second toothed members may be moved to a second stationary position different from the first stationary position. After the first and second toothed members are in the second stationary position, the plurality of fasteners are tightened down such that the ends of the locking component engage with the plurality of teeth of the first and second toothed members stationarily holding the first and second toothed members in the second stationary position. The change in position of the first and second toothed members changes the position of the support portion relative to the saddle contact portion. Furthermore, the bicyclist tightens, loosens, and adjusts the adjustable straps along with the first and second toothed members such that the bicyclist obtains a custom fit, which allows the bicyclist to obtain ample support and cushioning when riding the bicycle improving comfort of the bicyclist while riding the bicycle.

DETAILED DESCRIPTION

Figure 1A:
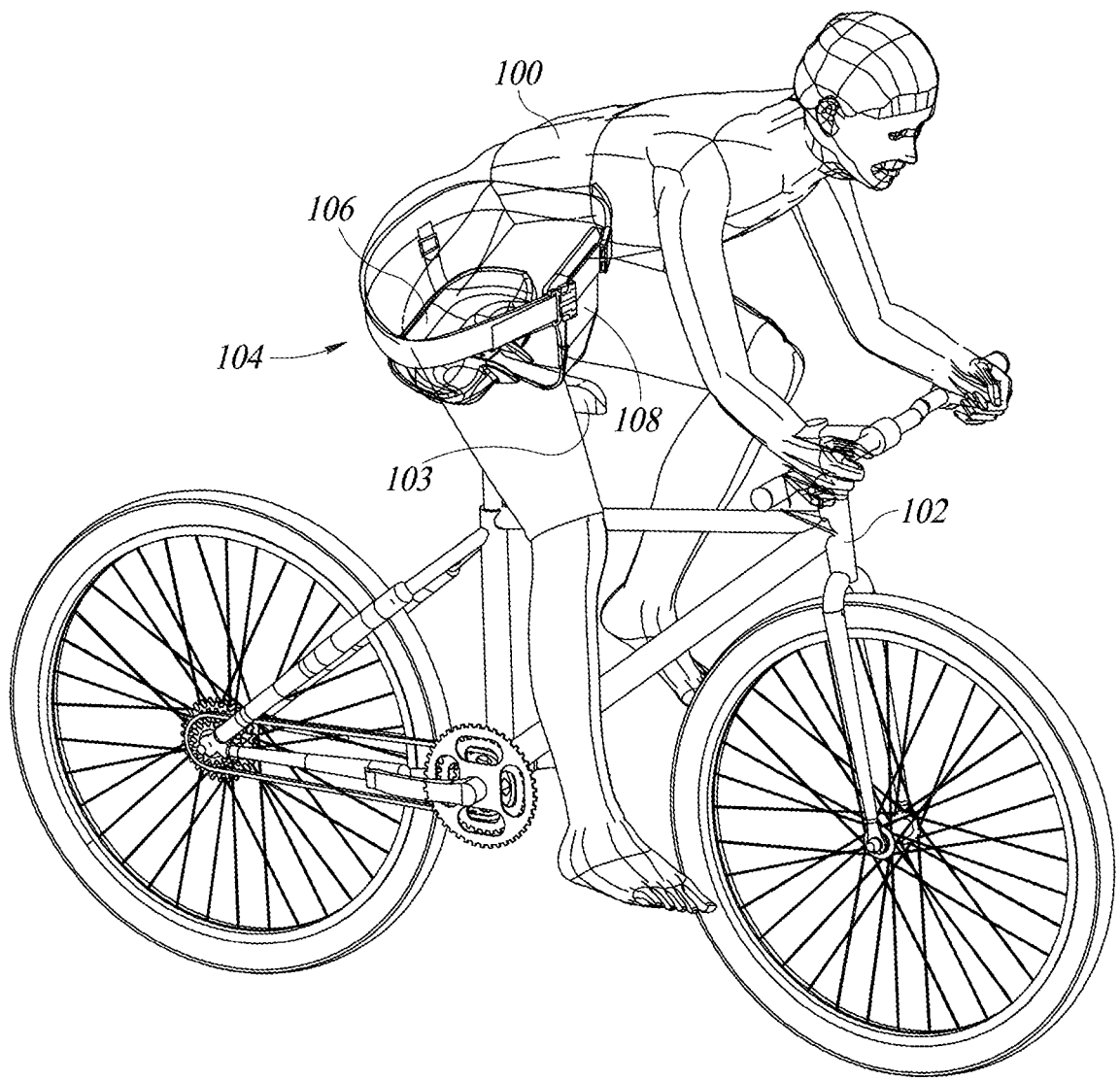
FIG. 1A illustrates (or shows, depicts, etc.) a bicyclist wearing an embodiment of a harness of the present disclosure while riding a bicycle.

In the following description, certain specific details are set forth in order to provide a thorough understanding of various embodiments of the disclosure. However, one skilled in the art will understand that the disclosure may be practiced without these specific details. In other instances, well-known structures and components associated with harnesses or utilizing harnesses have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second, third, fourth, etc., does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "top," "upper," "lower," "left," and "right," are used for only discussion purposes based on the orientation of the components in the discussion of the Figures in the present disclosure as follows. These terms are not limiting as to the possible positions explicitly disclosed, implicitly disclosed, or inherently disclosed in the present disclosure. The term "substantially" is used to clarify that there may be slight differences or variations as for when a surface is coplanar with another surface in the real world, as nothing can be made perfectly equal or perfectly the same. In other words, substantially means that there may be some slight variation in actual practice, and instead, is made within accepted tolerances.

As used in this specification and the appended claims, the singular forms "a," "an," and "the" include plural referents unless the content clearly dictates otherwise.

The present disclosure is directed to embodiments of harnesses for supporting and improving comfort of a bicyclist while riding a bicycle. For example, in at least one embodiment, the harness includes a support portion, which supports and contacts hips or a waist of the bicyclist, and a saddle contact portion, which supports and contacts a gluteus maximus (i.e., posterior, rear, butt, bottom, etc.) of the bicyclist. The saddle contact portion raises or suspends a perineum area (e.g., an area between an anus and a vulva or a scrotum of an individual) of the bicyclist (i.e., rider, operator, user, etc.) above the saddle of the bicycle such that the perineum area does not contact the saddle of the bicycle while riding the bicycle.

The harness includes an opening, a recess, or a channel aligned with the perineum area such that the perineum area does not contact the saddle of the bicycle or the harness. In other words, the perineum area of the bicyclist is suspended above the saddle and does not contact either the harness or the saddle such that ideally no pressure or stress is applied to the perineum area of the bicyclist while riding the bicycle.

By raising or suspending the perineum area in this manner, when the bicyclist sits up right on the saddle, the perineum area does not contact the saddle or the harness. Similarly, when the bicyclist leans forward on the saddle toward handle bars of the bicycle, the perineum area does not contact the saddle or the harness either. The saddle contact portion of the harness, further, assists in distributing the weight of the bicyclist such that the pressure applied to the bicyclist is evenly distributed and is not concentrated on a single area or point of the bicyclist.

By suspending and raising the perineum area of the bicyclist over the saddle and the harness, the pressure applied to the perineum area while riding the bicycle is relieved and reduced as compared to when the bicyclist is not wearing the harness and riding the bicycle. Relieving and avoiding this pressure applied to the perineum area of the bicyclist provides the bicyclist with a more comfortable riding experience, and reduces fatigue of the bicyclist as compared to when the bicyclist is not wearing the harness while riding the bicycle. In other words, the harness removes, reduces, and relieves pressure applied to the perineum area of the bicyclist while riding the bicycle. For example, the bicyclist experiences less stress and potential pain at the perineum area caused by vibrations or bouncing that may normally apply pressure to the perineum area while riding over a bump or an obstacle (e.g., a rock, a speed bump, etc.), over uneven terrain (e.g., a dirt biking path, a hillside, a forest path, etc.), and over flat terrain (e.g., a road made of concrete or asphalt, a gravel path, matted dirt path, a matted grass path, etc.). As another example, the bicyclist may be riding a bicycle outdoors or the bicyclist may be riding a stationary bicycle (e.g., an exercise bike machine, a rowing machine, etc.).

In at least some of the embodiments of the harness of the present disclosure, the saddle contact portion is adjustably coupled to the support portion, and a plurality of adjustable straps are coupled to and between the saddle contact portion and the support portion of the harness. The adjustability of the support portion relative to the saddle contact portion along with the adjustability of the plurality of adjustable straps provides the bicyclist with the ability to obtain a custom fit to improve comfort and reduce fatigue while riding the bicycle as discussed earlier. The custom fit being one that tightly, snuggly, and comfortably secures the harness to the bicyclist such that the harness does not rattle, move, or shift out of position while the bicyclist is riding the bicycle, utilizing exercise equipment, or participating in some other similar or like activity.

In this embodiment of the harness, the bicyclist may quickly, easily, and readily take off and put on the harness over external clothing after or before riding the bicycle. For example, while the bicyclist is taking a water or snack break along a bicycle path and not riding the bicycle, the bicyclist quickly, easily, and readily takes off the embodiment of the harness such that the bicyclist's movement is unimpeded and unhampered while taking the break.

Figure 1B:
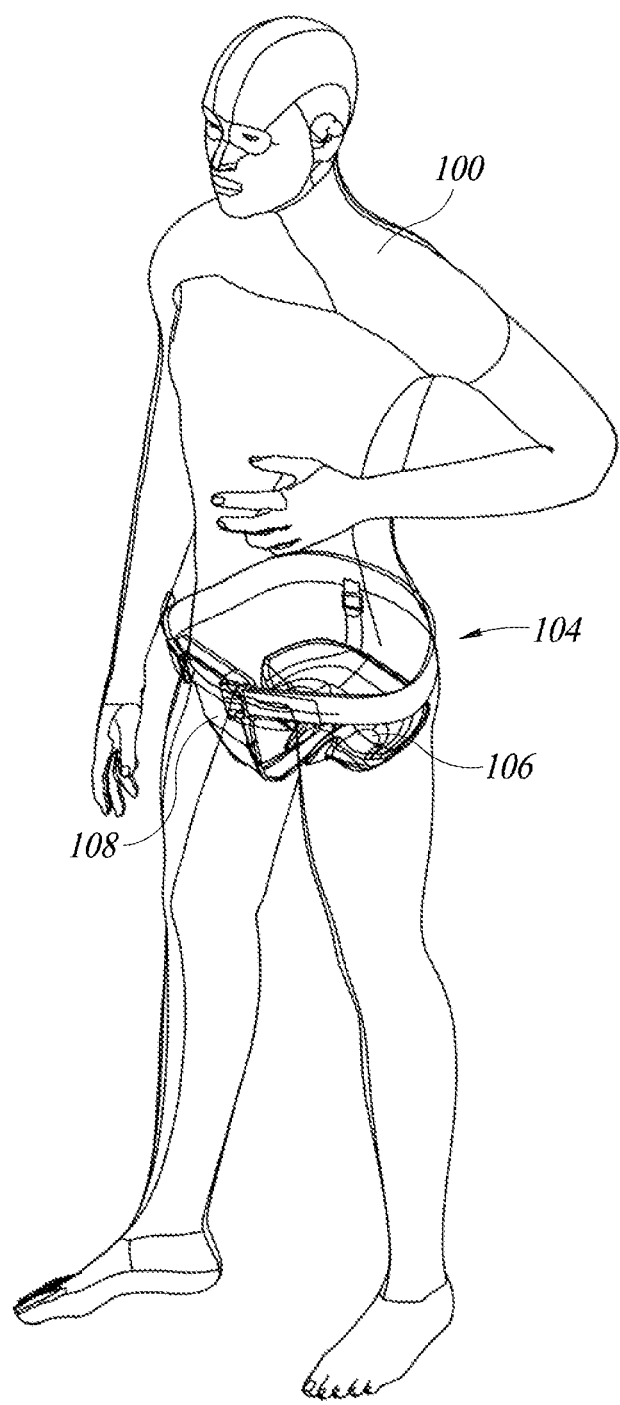
FIG. 1B illustrates (or shows, depicts, etc.) the bicyclist wearing the embodiment of the harness as shown in FIG. 1A while standing.

FIG. 1A is a perspective view of a bicyclist 100 riding a bicycle 102 while wearing an embodiment of a harness 104 of the present disclosure. FIG. 1B is directed to the bicyclist 100 wearing the harnesses 104 while standing.

As shown in FIGS. 1A and 1B, the harness 104 includes a saddle contact portion 106 and a support portion 108 coupled to the saddle contact portion 106. The positioning of the support portion 108 relative to the saddle contact portion 106 is adjustable from at least a first stationary position to a second stationary position. This adjustability of the support portion 108 relative to the saddle contact portion 106 will be discussed in further detail later with respect to FIGS. 2A-2G of the present disclosure.

The harness 104 is over and exterior to clothing of the bicyclist 100. In other words, the harness 104 is not underneath the clothing of the bicyclist 100, and, instead, the harness 104 is on the clothing of the bicyclist 100. As discussed earlier, the harness 104 being over the clothing of the bicyclist 100 allows the bicyclist 100 to remove the harness 104 once the bicyclist 100 is no longer riding the bicycle 102. Alternatively, the bicyclist 100 may readily put on the harness 104 over and exterior of their clothing when preparing to ride the bicycle 102. For example, the bicyclist 100 may readily remove the harness 104 when taking a break along a bicycle path (e.g., eating food, taking a break, walking around a destination, etc.) and may readily put on the harness 104 once ready to ride the bicycle 100 again.

The harness 104 being over and exterior to the clothing of the bicyclist 100 allows the harness 104 to move and shift with the bicyclist 100 while the bicyclist 100 is riding the bicycle 102. This movement and shifting of the harness 104 with the bicyclist 100 movements will be discussed in further detail with respect to FIGS. 4, 5, and 6 of the present disclosure.

Figure 2A:
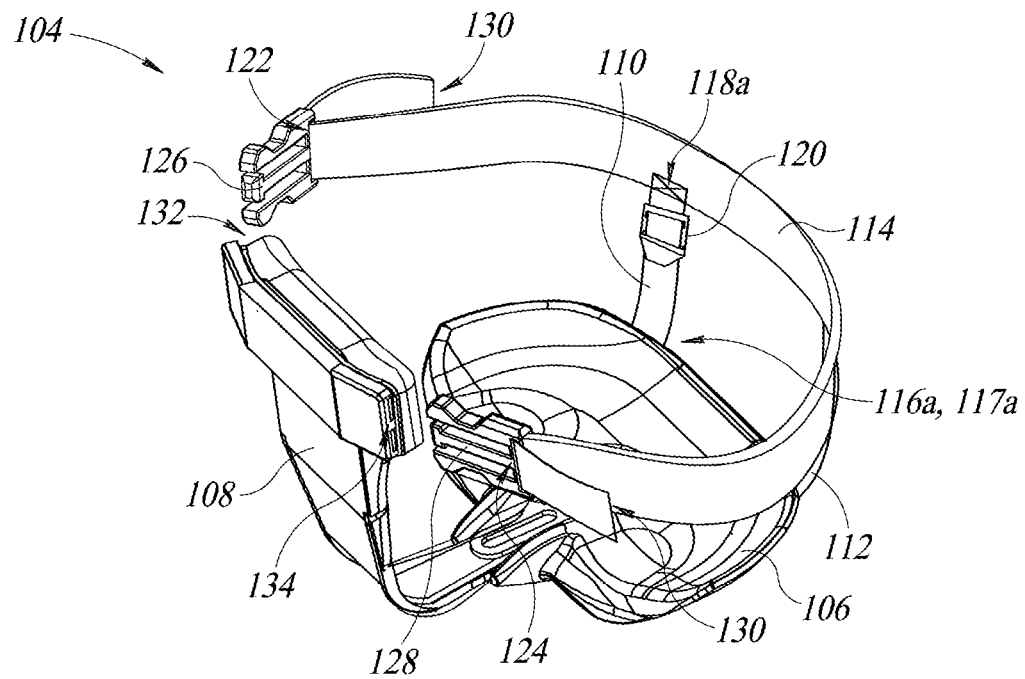
FIG. 2A is a front perspective view of the embodiment of the harness as shown in FIGS. 1A and 1B.
Figure 2B:
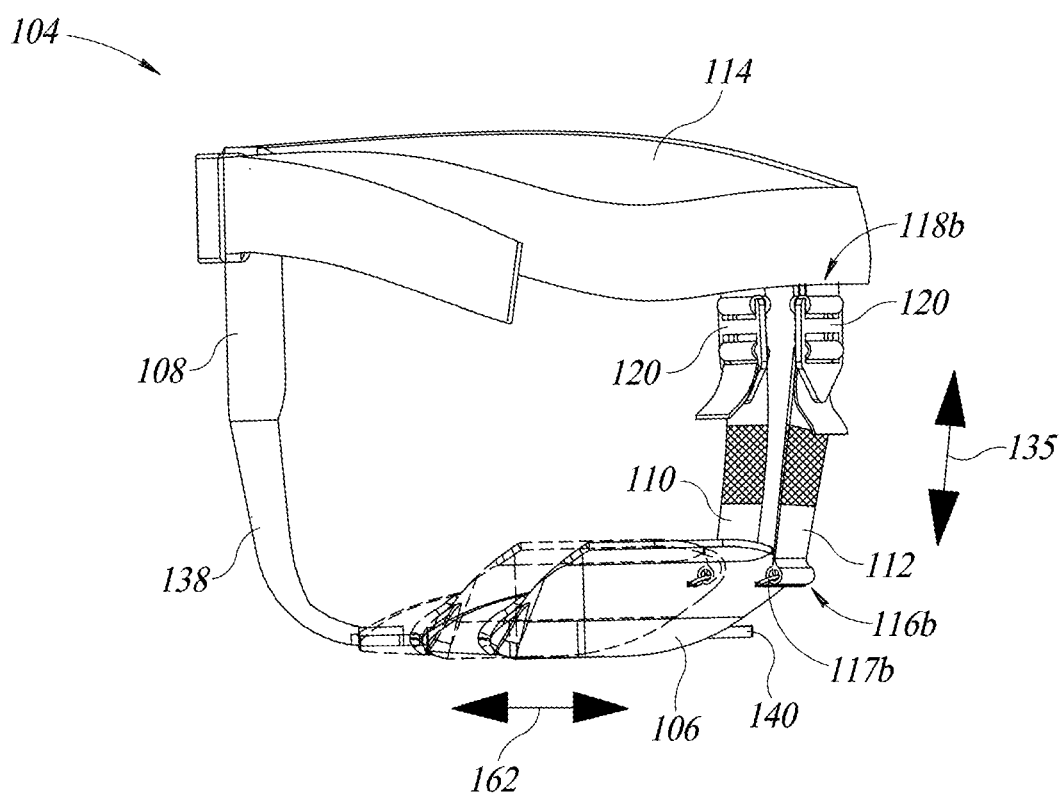
FIG. 2B is a side view of the embodiment of the harness as shown in FIG. 2A.
Figure 2C:
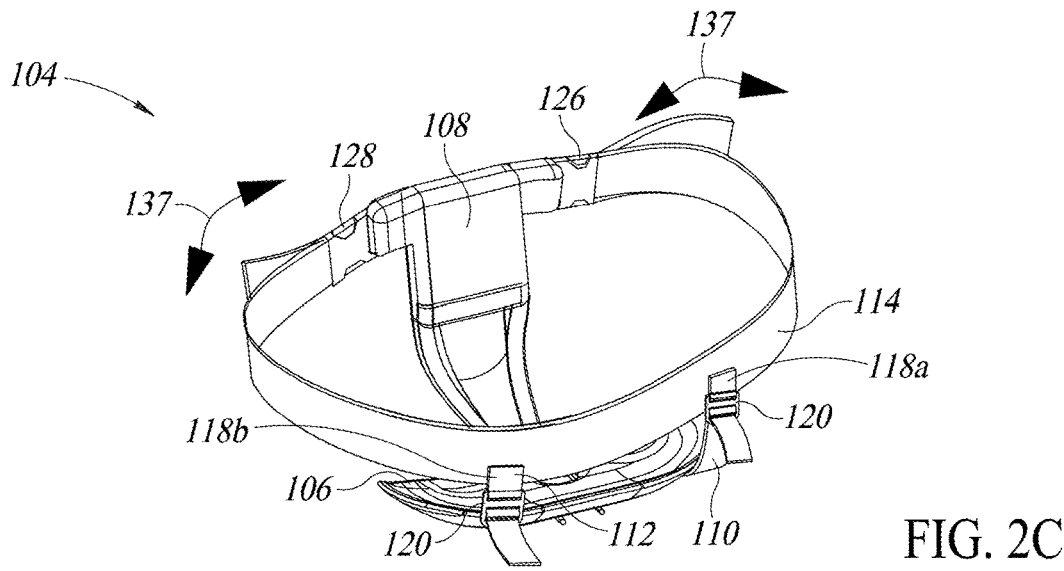
FIG. 2C is a rear perspective view of the embodiment of the harness as shown in FIGS. 2A and 2B.

FIGS. 2A-2C are directed to the embodiment of the harness 104 worn by the bicyclist 100 as shown in FIGS. 1A and 1B of the present disclosure. FIG. 2A is a front-side perspective view of the harness 104. FIG. 2B is a left-side view of the harness 104. FIG. 2C is a rear-side perspective view of the harness 104. The harness 104 includes a first adjustable strap 110, a second adjustable strap 112, and a third adjustable strap 114.

The first adjustable strap 110 is closer to a right-hand side of the harness 104 and the second adjustable strap 112 is closer to a left-hand side of the harness 104 based on the orientation of the harness 104 as shown in FIG. 2A. The first and second adjustable straps 110, 112 each have a first end 116a, 116b coupled to the saddle contact portion 106. The first ends 116a, 116b of the first and second adjustable straps 110, 112 are spaced apart from each other. The saddle contact portion 106 includes anchor components 117a, 117b that the first ends 116a, 116b of the first and second adjustable straps 110, 112 are wrapped around, respectively. The first ends 116a, 116b are sewn back to the first and second adjustable straps 110, 112, respectively, to couple the first ends 116a, 116b of the first and second adjustable straps 110, 112 to the anchor components 117a, 117b, respectively. The first end 116a of the first strap 110 and the anchor component 117a to which the first end 116 is coupled to is not readily viewable in FIGS. 2A-2G. However, the structure of the first end 116a and the anchor component 117a will be readily apparent in view of first end 116b and the anchor component 117b as shown in FIG. 2B.

In some embodiments, the first ends 116a, 116b of the first and second adjustable straps 110, 112 may be coupled to the saddle contact portion 106 by a glue, a hook-and-loop fastening system, or some other suitable fastening or coupling structure.

The first and second adjustable straps 110, 112 each have a second end 118a, 118b opposite to the first ends 116a, 116b of the first and second adjustable straps 110, 112, respectively. The second ends 118a, 118b of the first and second adjustable straps 110, 112 are spaced apart from each other. The second ends 118a, 118b of the first and second adjustable straps 110, 112 are coupled to the third adjustable strap 114 by sewing the second ends 118a, 118b to the third adjustable strap 114. The first and second adjustable straps 110, 112 each include an adjustment component 120, which may be a slip lock component. The adjustment components 120 allow a wearer of the harness 104 to adjust the length of the first and second adjustable straps 110, 112 such that the wearer may obtain a comfortable and custom fit based on the size and shape of the wearer. The length of the first and second adjustable straps 110, 112 being a distance between the first ends 116a, 116b and the second ends 117a, 117b, respectively, of the first and second adjustable straps 110, 112, respectively.

The third adjustable strap 114 includes a third end 122 and a fourth end 124 opposite to the third end 122. The second ends 118a, 118b of the first and second adjustable straps 110, 112 are positioned along the third adjustable strap 114 at locations between the third end 122 and the fourth end 124. A first male component 126 is coupled to the third end 122 and a second male component 128 is coupled to the fourth end 124. In view of this discussion, it will be readily appreciated that the third end 122 and the fourth end 124 are not termination ends 130 of the third adjustable strap 114 at which the third adjustable strap 114 actually terminates as shown in FIG. 2A. The first and second male components 126, 128 may be male buckle components of a side-squeeze buckle system.

The support portion 108 includes a first female reception component 132 at a first side of the support portion 108 and a second female reception component 134 at a second side of the support portion 108 opposite to the first side. The first female reception component 132 releasably receives the first male component 126 and the second female reception component 134 releasably receives the second male component 128.

In the embodiment of the harness 104 as shown in FIG. 2C, the first and second female reception components 132, 134 may be integral with the support portion 108 such that the first and second female reception components 132, 134 are integral with the support portion 108. However, in some embodiments, the first and second female reception components 132, 134 may be separate and distinct from the support portion 108 and are coupled to sides of the support portion 108.

For the sake of simplicity and brevity of the present disclosure only details discussing the interaction between the first male component 126 and the first female reception component 132 will be discussed in further detail. However, it will be readily appreciated that the following discussion of this interaction between the first male component 126 and the first female reception component 132 applies to the interaction between the second male component 128 and the second female reception component 134 as well.

When securing the harness 104 to the bicyclist 100, prongs of the first male component 126 enter the first female reception component 132 and snap into place, releasably coupling the first male component 126 to the first female reception component. When removing the harness 104 from the bicyclist 100, side surfaces of the prongs of the first male component 126 are pushed against and the first male component 126 is pulled on to remove the first male component 126 from the first female reception component 132. This releasable coupling of the first male component 126 to the first female reception component 132 allows the bicyclist 100 to quickly and easily remove the harness 104 or put on the harness 104 over exterior surfaces of clothing that the bicyclist 100 is wearing.

The first and second adjustable straps 110, 112 are adjustable in a first direction and the third adjustable strap 114 is adjustable in a second direction transverse to the first direction 135. The first direction is represented by arrows 135 as shown in FIG. 2B, and the second direction is represented by arrows 137 as shown in FIG. 2C. The adjustability of the first and second adjustable straps 110, 112 in the first direction and the third adjustable strap 114 in the second direction 137 provides adjustability for the bicyclist 100 to obtain a comfortable and custom fit with respect to the size and shape of the bicyclist's 100 gluteus maximus, hips, waist, and legs.

Figure 2D:
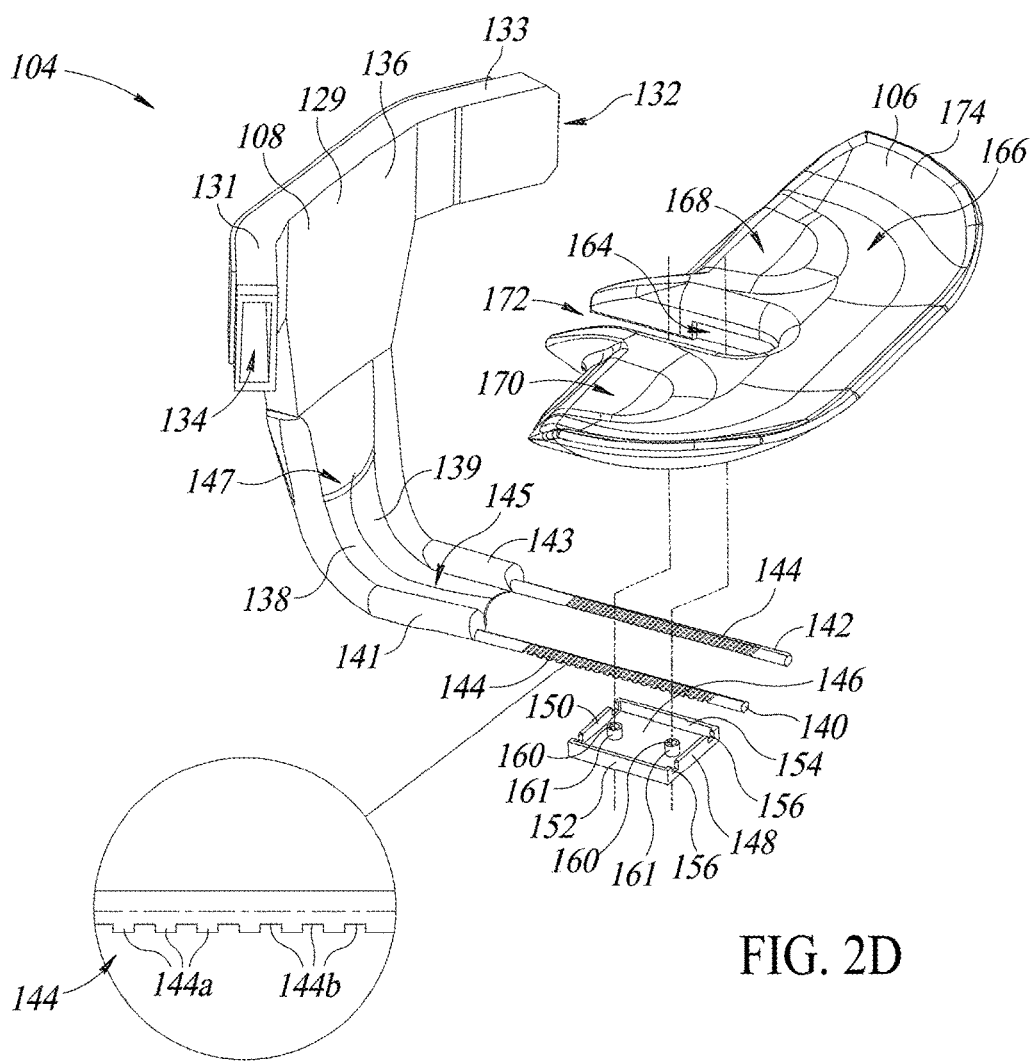
FIG. 2D is a partial exploded view of a support portion and a saddle contact portion of the harness directed to the embodiment of the harness as shown in FIGS. 2A-2C.

FIG. 2D is a partial exploded view of the support portion 108 and the saddle contact portion 106 of the embodiment of the harness 104 as shown in FIGS. 2A-2C. As discussed earlier, the saddle contact portion 106 is coupled to the support portion 108 of which the details will be discussed with respect to FIG. 2D. In FIG. 2D, the first, second, and third adjustable straps 110, 112, 114 are not visible and not shown such that surfaces of the saddle contact portion 106 and the support portion 108 are visible.

The support portion 108 includes an upper contact portion 136 and a lower contact portion 138. The functionality of the upper contact portion 136 and the lower contact portion 138 will be discussed in further detail with respect to FIG. 4 of the present disclosure. In some embodiments, the upper and lower contact portions 136, 138 may be separate and distinct from each other. In some embodiments, the upper and lower contact portions 136, 138 may be integral with each other such that the upper and lower contact portions 136, 138 are a unitary, continuous structure. The upper contact portion 136 has a first extension portion 131 and a second extension portion 133 that extend outward from a body portion 129 of the upper contact portion 136.

The lower contact portion 138 includes a middle portion 139 between a first lateral portion 141 and a second lateral portion 143. The middle portion 139 separates the first and second lateral portions 141, 143 from each other. The middle portion 139 includes an interior surface 145, which is convex, and an exterior surface 147, which is concave.

The middle portion 139 may be a channel portion, and the exterior surface 147 may be a channel surface. The middle portion 139 may be a channel portion as the middle portion 139 is less thick than the first and second lateral portions 141, 143. The exterior surface 147 may be a channel surface as the exterior surface 147 is the surface of the middle portion 139. The middle portion 139 may be a channel portion and the exterior surface 147 may be a channel surface that are curved to receive a forward portion of the saddle 103 of the bicycle 102 that is positioned between the bicyclists 100 thighs while riding the bicycle 102. For example, as discussed earlier, the exterior surface 147 is concave and curved to easily contact and rotate on the forward portion of the saddle 103 that is narrower than a rear portion of the saddle 103 of the bicycle 102. The forward portion of the saddle 103 is closer to a front wheel of the bicycle 100 than the rear portion of the saddle 103 of the bicycle 102.

The exterior surface 147 allows the bicyclist 100 to have greater lateral control of the bicycle 102. For example, when the bicyclist 100 is riding the bicycle 102, the bicyclist 100 may utilize the exterior surface 147 of the harness 104 to apply a force to the forward portion of the saddle 103 caused by leaning laterally with or against the saddle to assist in leaning or laterally moving (e.g., rotating) the bicycle 102. When the bicyclist is turning to the right, the bicyclist may laterally lean to the right to assist in turning to the right more quickly. Alternatively, if the bicycle 102 begins to fall over to the right while the bicyclist 100 is riding the bicycle 102, the bicyclist 100 may laterally lean to the left to assist in avoiding the bicycle 102 from falling over and crashing.

While the exterior surface 147 provides the bicyclist 100 with greater lateral control of the bicycle 102, the exterior surface 147 reduces and relives pressure points caused by the saddle 103 when the bicyclist 100 is riding the bicycle 102 as well. For example, when the bicyclist 100 laterally leans to lean the bicycle 102 in a direction, the exterior surface 147 will distribute a pressure applied by the saddle 103 to the bicyclist 100 evenly. This even distribution of the pressure reduces and relives pressure points between the bicyclist 102 and the saddle 103, and improves the riding experience of the bicyclist 100 by improving the bicyclist's 100 overall comfort while riding the bicycle 102. By way of an example, pressure points at a perineum area 151 (see FIG. 4 of the present disclosure) of the bicyclist 100 are relieved or reduced by the exterior surface 147. Other components of the harness 104 may assist in reducing and reliving pressure points along with the exterior surface 147.

The support portion 108 includes a first member 140 and a second member 142 spaced apart from the first member 140. The first and second members 140, 142 may be rods, dowels, or other suitable member. The first and second members 140, 142 couple the support portion 108 to the saddle contact portion 106. While not shown in the Figures, the first and second members 140, 142 may extend and pass through openings in the lower contact portion 138 and bend upward to extend into the upper contact portion 136 coupling the lower and upper contact portions 136, 138 together. In some embodiments, the first and second members 140, 142 extend into the lower contact portion 138 but do not extend into the upper contact portion 136, and, instead, the upper contact portion 136 is integral to the lower contact portion 136 (e.g., both made together of a single unitary and continuous material). In some embodiments, the first and second members 140, 142 extend into the lower contact portion 138 but do not extend into the upper contact portion 136, and, instead, the upper contact portion 136 is coupled to the lower contact portion 138 by at least one fastener (not shown) or by other coupling technique or structure.

The first and second members 140, 142 both include a plurality of teeth 144, which can more readily be seen in the enhanced zoomed in view in the lower left hand corner of FIG. 2D. The plurality of teeth 144 include a plurality of high regions 144a and a plurality of low regions 144b. Each respective high region 144a is positioned between two adjacent respective low regions 144b, and each respective low region is between two adjacent respective high regions 144a. The high regions 144a may be plateaus, hills, crests, raised portions, or some other suitable structure. The low regions 144b may be valleys, troughs, recesses, recessed portions, or some other suitable structure. The pluralities of high and low regions 144a, 144b wrap around the first and second members 140, 142. The first and second members 140, 142 may be first and second toothed members 140, 142.

The harness 104 further includes a locking component 146 that interlocks with the pluralities of teeth 144 of the first and second members 140, 142 such that the locking component 146 holds the first and second members 140, 142 in a first stationary position. The locking component 146 has a first sidewall 148 and a second sidewall 150 opposite to the first sidewall 148, and has a third sidewall 152 and a fourth sidewall 154 that extend between the first sidewall 148 and the second sidewall 150. The third sidewall 152 is opposite the fourth sidewall 154. The third and fourth sidewalls 152, 154 are transverse to the first and second sidewalls 148, 150.

The locking component 146 further includes a plurality of slots 156 that extend through the first and second sidewalls 148, 150 of the locking component 146. The plurality of slots 156 may be a plurality of openings, a plurality of reception openings, a plurality of interlocking openings, a plurality of recesses, or some other similar or like structure. First ones of the plurality of slots 156 receive the first member 140 and interlock with ones of the plurality of teeth 144 of the first member 140. Second ones of the plurality of slots 156 receive the second member 142 and interlock the plurality of teeth 144 of the second member 142. The details of the interlocking between the locking component 146 and the first and second members 140, 142 will be discussed in further detail as follows within the present disclosure.

The locking component 146 further includes openings 160 extending through the locking component 146. The openings 160 extend through the locking component 146 in a direction transverse to a direction of which the plurality of slots 156 extend through the first and second sidewalls 148, 150. The plurality of openings 160 surrounded by a plurality of boundary portions 161. Each of the boundary portions 161 surrounds a corresponding one of the openings 160. The boundary portions 161 are cylindrical portions through which the openings 160 pass through and extend. The plurality of openings 160 receive a plurality of fasteners (which are not shown) that couple the locking component 146 to the saddle contact portion 106. The plurality of fasteners may be plurality of screw fasteners, a plurality of snap fit fasteners, or some other plurality of adjustable fastener that the bicyclist may loosen or tighten. The details of the loosening and tightening of the locking component 146 will be discussed in further detail as follows within the present disclosure.

The positioning of the support portion 108 relative to the saddle contact portion 106 is adjustable through the combination of the first and second members 140, 142 and the locking component 146. For example, the plurality of teeth 144 of the first and second members 140, 142 are positioned within ones of the plurality of slots 156 of the locking component 106. When the plurality of teeth 144 are positioned within the plurality of slots 156, ones of the low regions 144b receive portions of the first and second sidewalls 148, 150, and ones of the high regions 144a abut the portions of the first and second sidewalls 148, 150. When tightening the plurality of fasteners (which are not shown) passing through the plurality of openings 160 coupling the locking component 146 to the saddle contact portion 106, the interaction between the first and second sidewalls 148, 150 and the pluralities of teeth 144 interlock and engage with each other locking the support portion 108 in a first stationary position. When loosening the plurality of fasteners (which are not shown), the portions of the first and second sidewalls 148, 150 of the locking component disengage and unlock with the pluralities of teeth 144 of the first and second members 140, 142. When the locking component 146 disengages with the pluralities of teeth 144, the first and second members 140, 142 are moveable from the first stationary position to a second stationary position different from the first stationary position. Once the first and second members 140, 142 are in the second stationary position, the locking component 146 is tightened down to lock the first and second members 140, 142 and hold the support portion 108 in the second stationary position.

The spacing between ones of the high regions 144a of the pluralities of teeth 144 and the number of teeth define a distance between various positions of the support portion 108 relative to the saddle contact portion 106. For example, a first distance between the high regions 144a results in the distance between stationary positions of the support portion 108 being further apart relative to a second distance between the high regions 144a being less than the first distance.

In some embodiments, the plurality of fasteners may be configured to be loosened with the use of tools (e.g., a screw driver, a custom tool, etc.). For example, screws compatible with a Phillips head screw driver, screws compatible with a flat head screw driver, screws compatible with an Alan wrench, or some other type of plurality of fasteners configured to be loosened by tools.

In some embodiments, the plurality of fasteners may be configured to be loosened without tools (e.g., clamp fasteners, button-snap fasteners, snap-clamp fasteners, or some other type of fasteners that can be locked or unlocked without utilizing tools). For example, a clamp, a button snap fastener, or some other type of fastener that may be locked or unlocked by the hands of the bicyclist 100 without the use of tools.

The first and second members 140, 142 are moveable in a third direction 162, which is different form the first direction 135 of the adjustability of the first and second straps 110, 112 and is different from the second direction 137 of the adjustability of the third strap 114. The adjustability of the first and second members 140, 142 in the third direction 162 is represented by the arrows 162 as shown in FIG. 2B. The third direction 162 is transverse to the first and second directions 135, 137. The third direction 162 may be substantially perpendicular to the first direction 135.

The adjustability of the first, second, and third straps 110, 112, 114 with the adjustability of the positioning of the support portion 108 relative to the saddle contact portion 106 utilizing the first and second members 140, 142 and the locking component 146 provides the bicyclist 100 with a comfortable and custom fit. This variable adjustability allows the bicyclist 100 to obtain a comfortable and custom fit as preferred by the bicyclist 100 while riding the bicycle 102.

A recess 164 in the saddle contact portion 106 receives the locking component 146. The recess 164 is at an outer surface of the saddle contact portion 106. As shown in FIG. 2D, the recess 164 receives the fourth sidewall 154 of the locking component 146. While not shown, the saddle contact portion 106 has another recess opposite to the recess 164, and the other recess receives the third sidewall 152 of the locking component 146. In some embodiments, the saddle contact portion 106 may have additional recesses or reception areas that receive the first, second, third, and fourth sidewalls 148, 150, 152, 154 or may receive some other combination of the first, second, third, and fourth sidewalls 148, 150, 152, 154 of the locking component 146. The recess 164 or recesses provide a visual indication and guide for where the locking component 146 is located when coupling the first and second members 140, 142 of the support portion 108 to the saddle contact portion 106 by the locking component 146.

The saddle contact portion 106 further includes a first concave surface 166, a second concave surface 168, and a third concave surface 170. The first concave surface 166 extends from the second concave surface 168 to the third concave surface 170. The first, second, and third concave surfaces 166, 168, 170 of the saddle contact portion 106 contact and support the bicyclist 100 when the bicyclist 100 is sitting on the saddle of the bicycle 102. For example, the first concave surface 166 may be structured to receive the gluteus maximus of the bicyclist 100, and the second and third concave surfaces 168, 170 may be structured to receive thighs of the bicyclist 100. In other words, the first, second, and third concave surfaces 166, 168, 170 are configured and structured to readily conform to the bicyclist and reduce the likelihood of pressure points between the bicyclist 100 and the harness 104.

The saddle contact portion 106 has an opening 172 that is positioned between the second and third concave surfaces 168, 170 as shown in FIG. 2D. The opening 172 may be a recess, a channel, or some other similar or like opening. When the bicyclist 100 is wearing the harness 104, the opening 172 is aligned with a perineum area 151 of the bicyclist 100 such that the saddle contact portion 106 does not contact the perineum area 151 of the bicyclist 100. When the bicyclist 100 sits on a saddle 103 of the bicycle 102 while wearing the harness 104, the harness 104 suspends the perineum area 151 of the bicyclist 100 above the saddle such that the perineum area 151 does not physically contact the harness 104 nor the saddle. The suspension of the perineum area 151 of the bicyclist 100 reduces the likelihood of pressure points, stress points, and pain points at the perineum area 151 of the bicyclist 100 while riding the bicycle 102. The perineum area 151 may be readily seen in FIGS. 3A and 4.

Figure 2E:
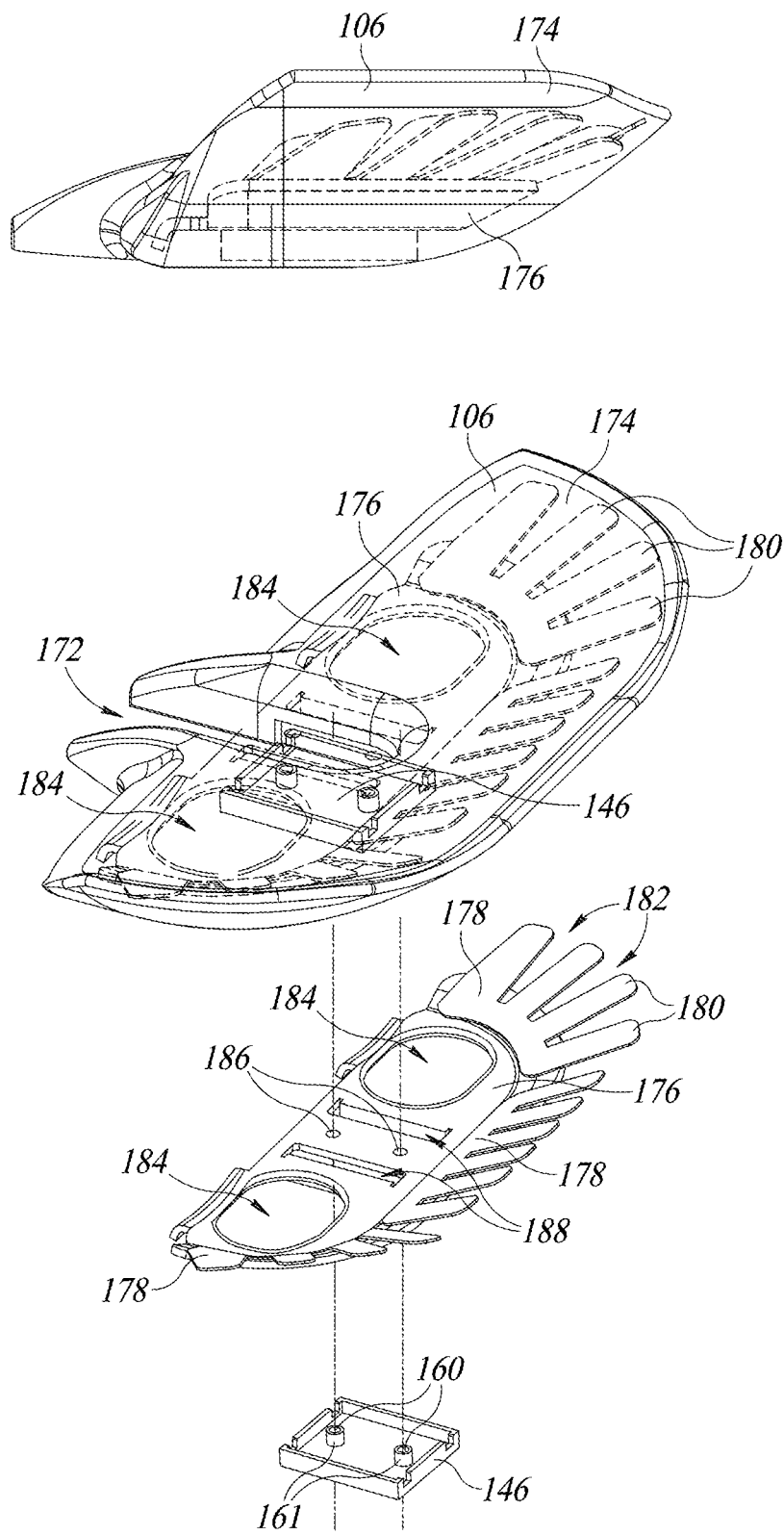
FIG. 2E is a partial exploded view of the saddle contact portion of the harness directed to the embodiment of the harness as shown in FIGS. 2A-2C.

FIG. 2E is a partially exploded view of the saddle contact portion 106 of the embodiment of the harness 104 as shown in FIGS. 2A-2D. The saddle contact portion 106 includes an outer portion 174 and an inner portion 176 surrounded by the outer portion 174. The saddle contact portion 106 may be a cushion component, a cushion contact portion, cushion saddle contact portion, or may be some other suitable component for contacting the saddle 103 when the bicyclist 100 is riding the bicycle 102.

In some embodiments, the inner portion 176 may be encased within the outer portion 174. In some embodiments, the inner portion 176 may be on or at a lower surface of the outer portion 174.

The outer portion 174 may be made of a soft material and the inner portion 176 may be made of a rigid material, a semi-rigid material, a semi-flexible material, or some other type of bendable material. When the outer portion 174 is a soft material and the inner portion 176 is a semi-flexible material, the inner portion 176 provides structural integrity to the saddle contact portion 106 that otherwise may not be provided if only the soft material was utilized alone without the semi-flexible material. The inner portion 176 is a core support portion and the outer portion 174 is around the inner portion 176.

The inner portion 176 includes a plurality of extension portions 178 that each have a plurality of tabs 180. Adjacent ones of the tabs 180 are spaced apart from each other by spaces 182. The plurality of tabs 180 extend away from the opening 172 toward an outer edge of the saddle contact portion 106. The plurality of tabs 180 are bendable and flexible in response to a pressure applied to the saddle contact portion 106. The plurality of tabs 180 may be a plurality of fingers, a plurality of extensions, a plurality of cantilevers, or some other similar or like structure that may bend or flex when the bicyclist 100 is riding the bicycle 102 and is wearing the harness 104.

For example, when the bicyclist 100 is riding the bicycle, a right butt cheek of the bicyclist 100 may contact and apply pressure to the saddle contact portion 106 and a left butt check of the bicyclist 100 may lift off the saddle contact portion 106 deflecting some of the plurality of tabs 180 aligned with the right butt cheek. As the right butt cheek applies pressure to the saddle contact portion 106, the tabs 180 underneath the right butt cheek bend and flex. As the tabs 180 bend and flex, the tabs 180 are displaced from a first position to a second position based on the pressure applied to the outer portion 174 of the saddle contact portion 106 and transferred to the tabs 180 of the inner portion 176. When the left butt cheek lifts and does not apply pressure to the saddle contact portion 106, the tabs 180 underneath the left butt cheek lift up and move from a first position to a second position. For example, the tabs 180 may move between a deformed state and a non-deformed state as a pressure is applied and distributed across the saddle contact portion 106 as the bicyclist 100 is riding the bicycle 102 when wearing the harness 104. The plurality of tabs 180 provide semi-rigid support while still being deformable such that the bicyclist 100 is supported while still providing a comfortable riding experience reducing fatigue of the bicyclist 100 by reducing the likelihood of pressure points being applied to the bicyclist 100.

In some embodiments, the plurality of extension portions 178 may be replaced with a unitary, continuous material such that three extension portions as shown in FIG. 2E are instead all integral with each other and made of a single, unitary, continuous structure. The inner portion 176 further includes first openings 184, wherein one of the first openings 184 is aligned with the second concave surface 168 and the other of the first openings 184 is aligned with the third concave surface 170. The first openings 184 aligned with the second and third concave surfaces 168, 170 reduces the overall stiffness or rigidity of the outer portion 174 at the second and third concave surfaces 168, 170. For example, the outer portion 174 at the second and third concave surface 168, 170 may deform by a greater amount than at the first concave surface 166, which is aligned with the plurality of tabs 180 of the inner portion 176.

The inner portion 176 further includes second openings 186. In some embodiments, the second openings 186 may receive the boundary portions 161 of the locking component 146 such that the locking component is partially inset within the inner portion 176. In some embodiments, the second openings 186 may only receive the plurality of fasteners. The inner portion 176 further includes third openings 188. In some embodiments, the third openings 188 may receive the third and fourth sidewalls 152, 154 of the locking component 146 such that the locking component is partially inset the inner portion 176. In some embodiments, the locking component 146 and the plurality of fasteners may couple the inner portion 176 to the outer portion 174.

Figure 2F:
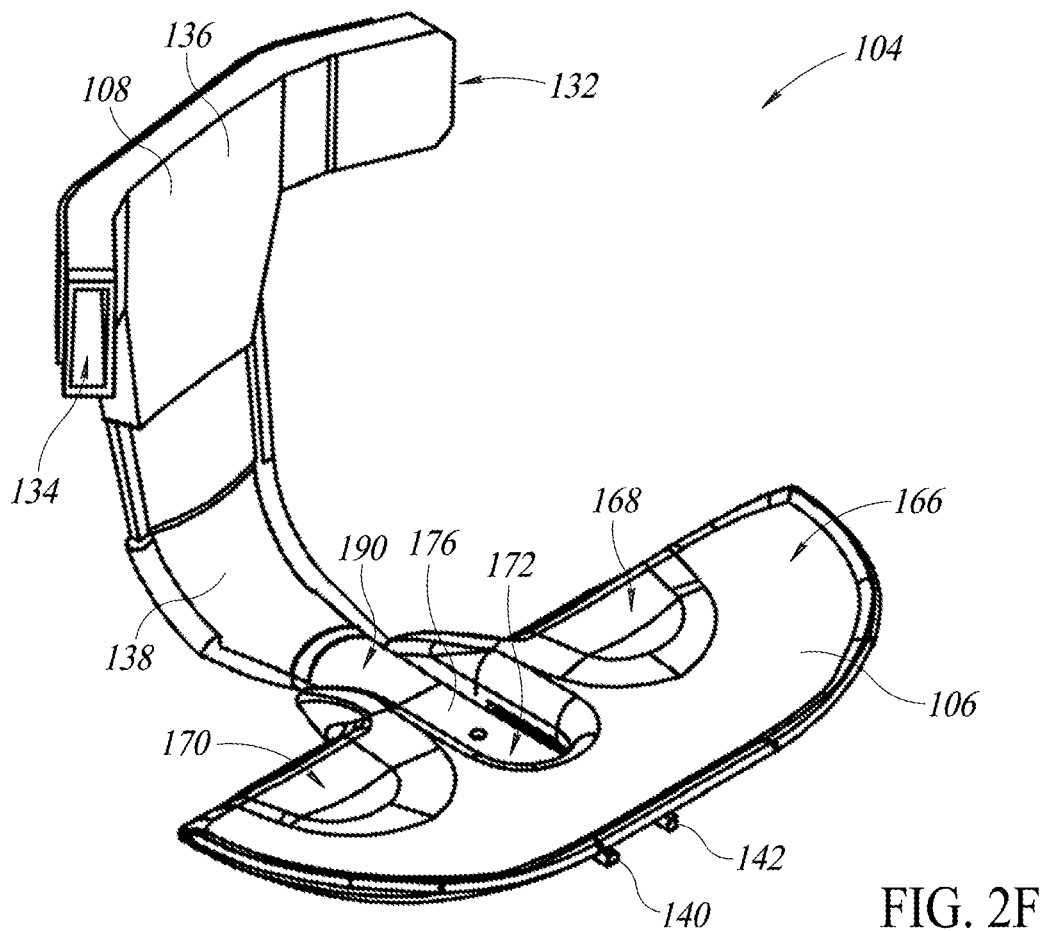
FIG. 2F is a partial rear perspective view of the saddle contact portion and the support portion of the harness directed to the embodiment as shown in FIGS. 2A-2C.

FIG. 2F is a partial rear perspective view of the saddle contact portion 106 and the support portion 108 of the harness 104 directed to the embodiment as shown in FIGS. 2A-2E. In the rear perspective view in FIG. 2F, the first, second, and third adjustable straps 110, 112, 114 have been removed from FIG. 2F for ease of viewing interior surface of the support portion 108 and the saddle contact portion 106.

As shown in FIG. 2F, the support portion 108 includes an opening 190 extending from the lower contact portion 138 to the saddle contact portion 106. The opening 190 extends from the first member 140 to the second member 142. Similar to the opening 172 being aligned with the perineum area 151 of the bicyclist 100, the opening 190 is aligned with the perineum area 151 of the bicyclist 100 as well. Similar to the opening 172, when the bicyclist 100 is wearing the harness 104, the opening 190 is aligned with the perineum area 151 of the bicyclist 100 such that the saddle contact portion 106 does not contact the perineum area 151 of the bicyclist 100. When the bicyclist 100 sits on the saddle 103 of the bicycle 102 while wearing the harness 104, the perineum area 151 of the bicyclist 100 is suspended above the saddle and does not contact either the harness 104 or the saddle. The suspension of the perineum area 151 of the bicyclist results in mitigation or restriction of pressure points or stress points resulting at the perineum area 151 of the bicyclist 100 while the bicyclist 100 is riding the bicycle 102.

Figure 2G:
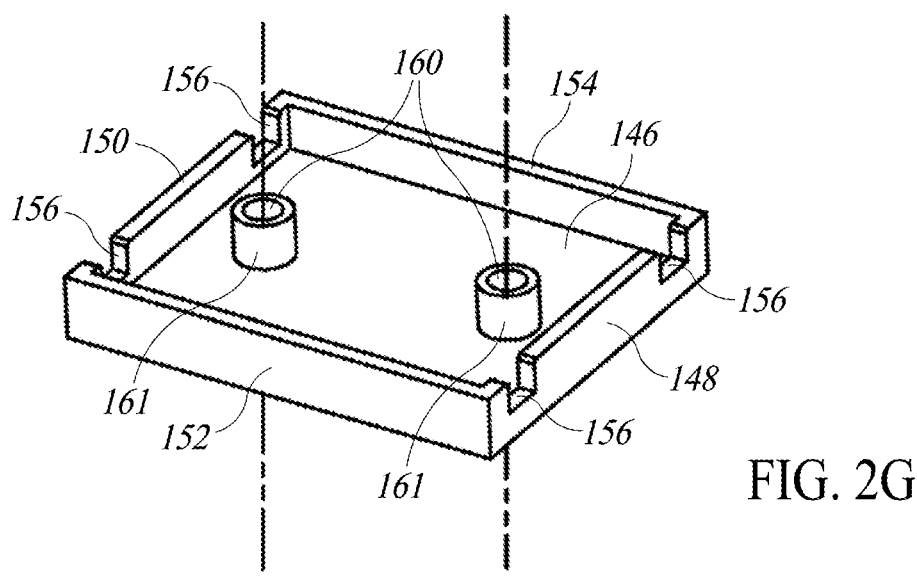
FIG. 2G is directed to a locking component of the embodiment of the harness coupling the saddle contact portion to the support portion as shown in FIG. 2A-2D.

FIG. 2G is a zoom in view of the locking component 146, which was described in detail earlier within the present disclosure. For the sake of simplicity and brevity of the present disclosure, the details of the locking component will not be reproduced here within the present disclosure.

Figure 3A:
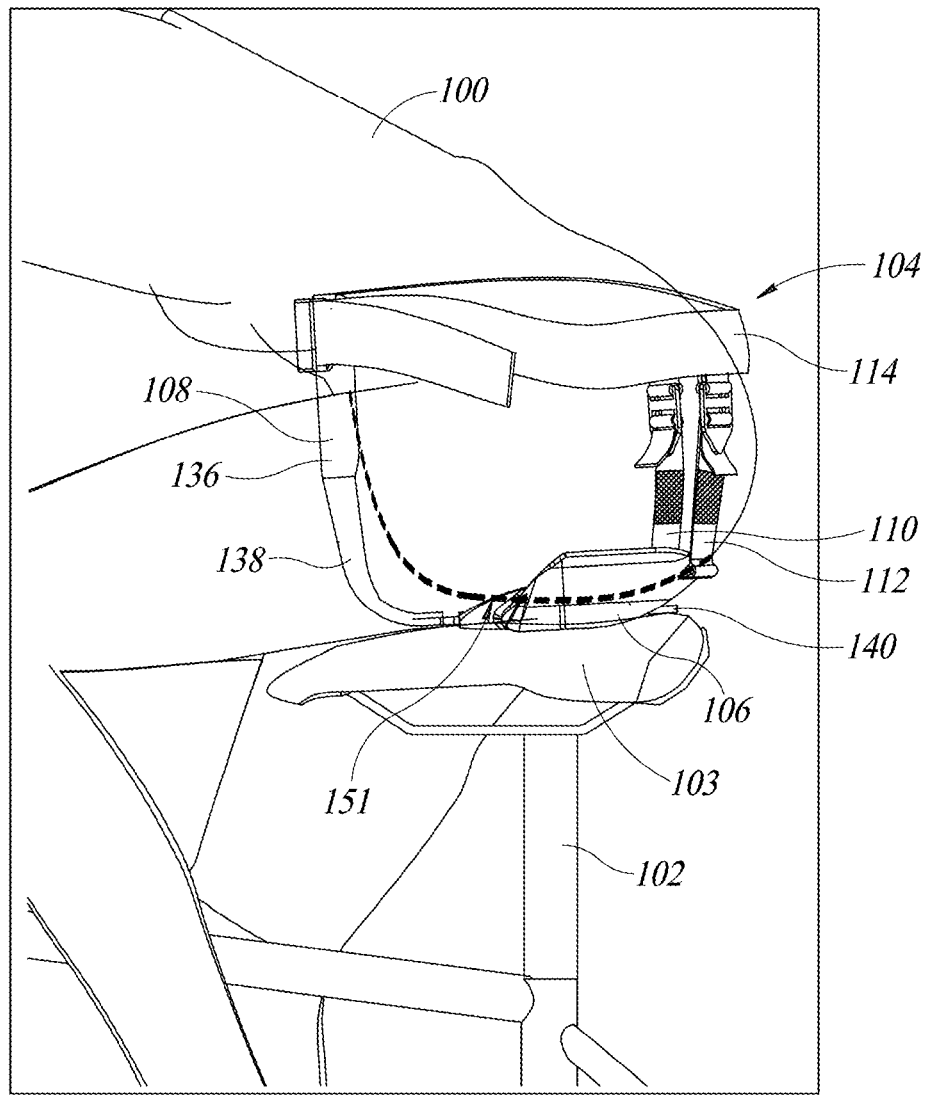
FIG. 3A is a zoomed in side view directed to the bicyclist riding a bicycle while wearing the embodiment of the harness as shown in FIGS. 1A, 1B, and 2A-2G.

FIG. 3A is directed to zoomed in side view of the bicyclist 100 riding the bicycle 102 while wearing the harness 104. As shown in FIG. 3A, the saddle contact portion 106 contacts the saddle 103 of the bicycle 102 while the bicyclist 100 is riding the bicycle 102.

Figure 3B:
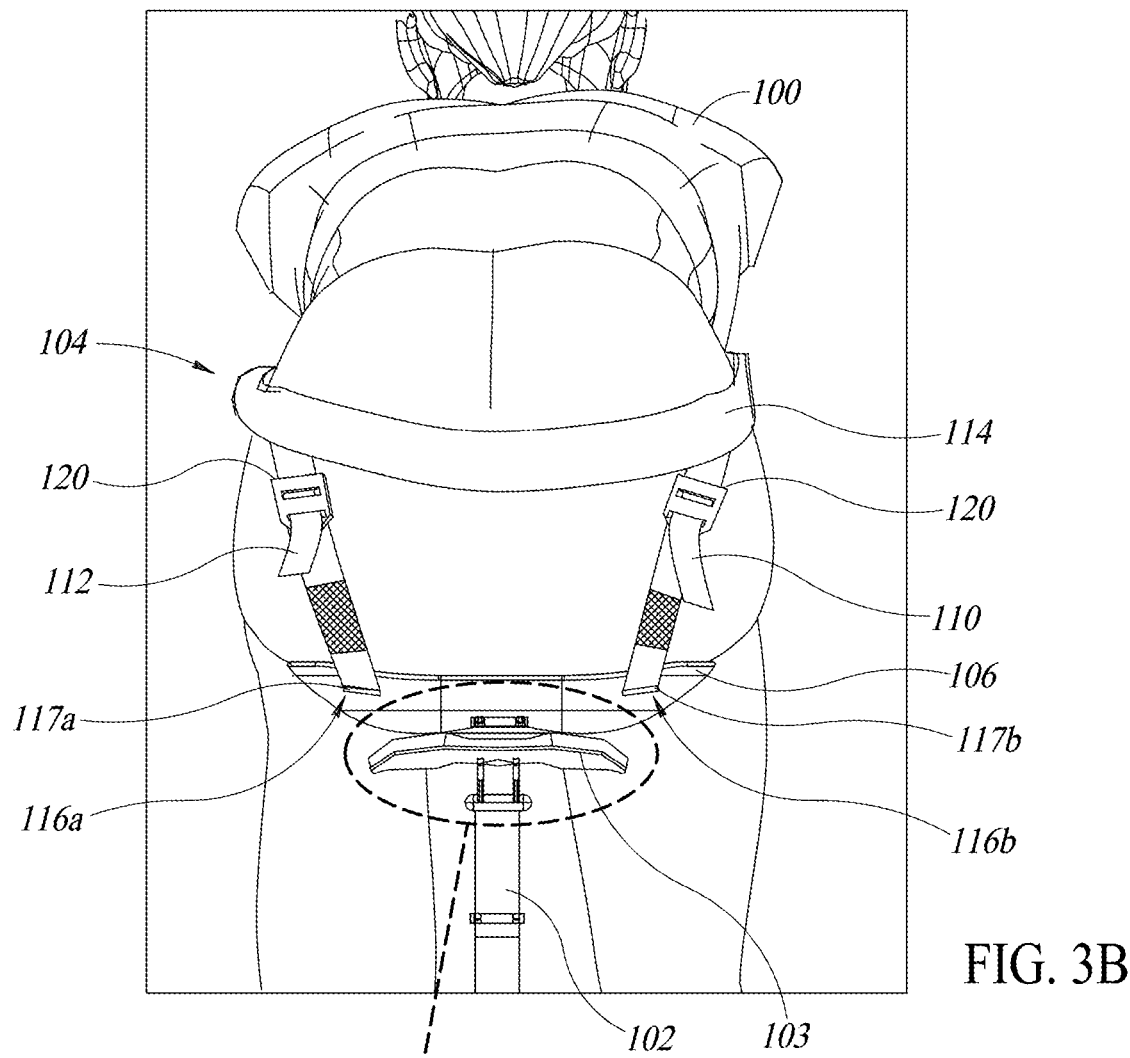
FIG. 3B is a zoomed in rear view directed to the bicyclist riding the bicycle while wearing the embodiment of the harness as shown in FIGS. 1A, 1B, and 2A-2G.

FIG. 3B is a rear side zoomed in view of the bicyclist 100 riding the bicycle 102 while wearing the harness 104. As shown in FIG. 3B, the saddle contact portion 106 contacts the saddle 103 of the bicycle 102 while the bicyclist 100 is riding the bicycle 102.

Figure 3C:
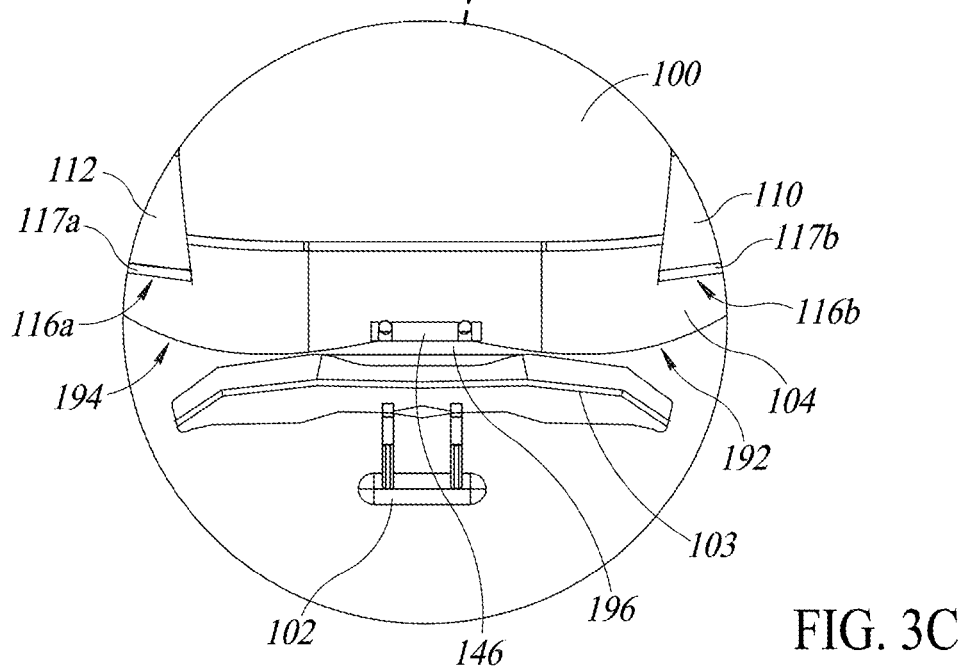
FIG. 3C is a zoomed in rear view where the embodiment of the harness as shown in FIGS. 1A, 1B, and 2A-2G worn by the bicyclist contacts a saddle of the bicycle.

FIG. 3C is an enhanced and zoomed in view of a portion of FIG. 3B. As shown in FIG. 3C, the saddle contact portion 106 contacts the saddle 103 of the bicycle 102 while the bicyclist 100 is riding the bicycle 100. As shown in FIG. 3C, the saddle contact portion 106 further includes a first convex surface 192 and a second convex surface 194, which are surfaces of a lower outer surface of the saddle contact portion 106. The first and second convex surfaces 192, 194 contact the saddle 103 of the bicycle 102 when the bicyclist 100 is riding the bicycle.

As shown in FIG. 3C, a gap 196 is between the first and second convex surfaces 192, 194 when the harness 104 contacts the saddle 103 of the bicycle 102. The gap 196 spaces the locking component 146 from the saddle 103 of the bicycle 102 such that the locking component 146 does not contact the saddle 103 of the bicycle 102.

As shown in FIG. 3C, the first and second convex surfaces 192, 194 suspend and raise the perineum area 151 of the bicyclist 100 above the saddle 103 of the bicycle 102. The suspension and raising of the perineum area 151 reduces the overall pressure applied to the perineum area 151 of the bicyclist 100 when riding the bicycle 102, which reduces overall fatigue of the bicyclist 100 while riding the bicycle 102.

For example, while not wearing the harness 104 the perineum area 151 of the bicyclist 100 will contact the saddle 103 of the bicycle 102. Over time, while riding the bicycle 102, pressure applied to the perineum area 151 by the saddle 103 of the bicycle 102 may result in pain or uncomfortable pressure in or at the perineum area 151. This pain or uncomfortable pressure may affect the mental state of the bicyclist 100 or may cause the bicyclist 100 to move into a position to ride the bicycle 102 that is less efficient. This mental pain, physical pain, or reduced efficiency increases the fatigue of the bicyclist 100 reducing the overall time the bicyclist 100 can ride the bicycle 102.

Alternatively, when the bicyclist 100 wears the harness 104, the pressure applied to the perineum area 151 will be reduced as compared to when the bicyclist 100 is not wearing the harness. This reduction in pressure to the perineum area 151 of the bicyclist 100 while riding the bicycle 102 reduces fatigue of the bicyclist and increases the overall time that the bicyclist may comfortably ride the bicycle 102.

Figure 4:
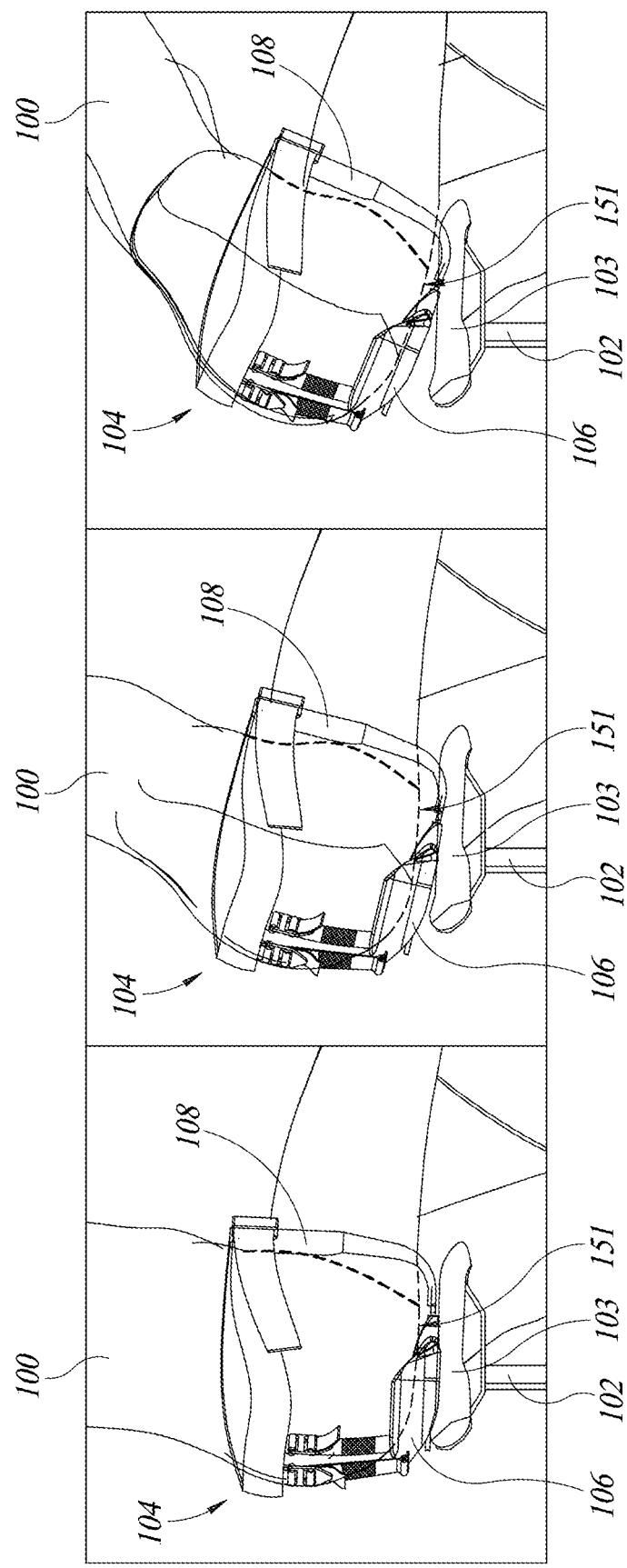
FIG. 4 is zoomed in views directed to the bicyclist riding a bicycle while wearing the embodiment of the harness as shown in FIGS. 1A, 1B, 2A-2G, and 3A-3C.

FIG. 4 is zoomed in views directed to the bicyclist 100 riding the bicycle 102 while wearing the embodiment of the harness 104. The left-hand side image of FIG. 4 illustrates the bicyclist 100 sitting in an upright position. The center image of FIG. 4 illustrates the bicyclist 100 slightly leaning forward toward handlebars of the bicycle 102. The right-hand side image of FIG. 4 illustrates the bicyclist 100 leaning forward such that the bicyclist's 100 forearms may be resting on the handlebars of the bicycle 102.

The central and right-most images in FIG. 4 illustrate the bicyclist 100 leaning forward toward the handlebars of the bicycle 100. When the bicyclist 100 is sitting upright as shown in the left-most image in FIG. 4, the saddle contact portion 106 is contacting the saddle 103 of the bicycle 102 and the support contact portion 108 may contact or may not contact the saddle 103 of the bicycle 102. When the bicyclist 100 is slightly leaning forward towards the handlebars of the bicycle 102 as shown in the central image in FIG. 4, the saddle contact portion 106 and the support portion 108 of harness 104 may both contact the saddle 103 of the bicycle 102. When the bicyclist 100 is completely leaning forward towards the handlebars of the bicycle 102 as shown in the right-most image in FIG. 4, the saddle contact portion 106 may be raised above the saddle 103 of the bicycle 102 and not contact the saddle 103, and the support portion 108 is contacting the saddle 103 of the bicycle 102. In other words, as the bicyclist 100 leans forward by different amounts toward the handlebars of the bicycle 102, the saddle contact portion 106 and the support portion 108 may come in and out of physical contact with the saddle 103 of the bicycle 102. This physical contact results based on the positioning of the bicyclist 102 on the saddle 103 of the bicycle 102 and relative to the amount that the bicyclist 100 leans forward toward the handlebars of the bicycle 102.

In the left-hand side image of FIG. 4, the saddle contact portion 106 contacts the saddle 103 of the bicycle 102 and the support portion 108 may not be contacting the saddle 103 of the bicycle 102. In the center image of FIG. 4, the saddle contact portion 106 and the support portion 108 may both contact the saddle 103 of the bicycle 102. In the right-hand side image of FIG. 4, the support portion 108 contacts the saddle 103 of the bicycle 102 and the saddle contact portion 106 may not be contacting the saddle 103 of the bicycle 102 such that the saddle contact portion 106 is raised above the saddle 103 of the bicycle 102.

Figure 5:
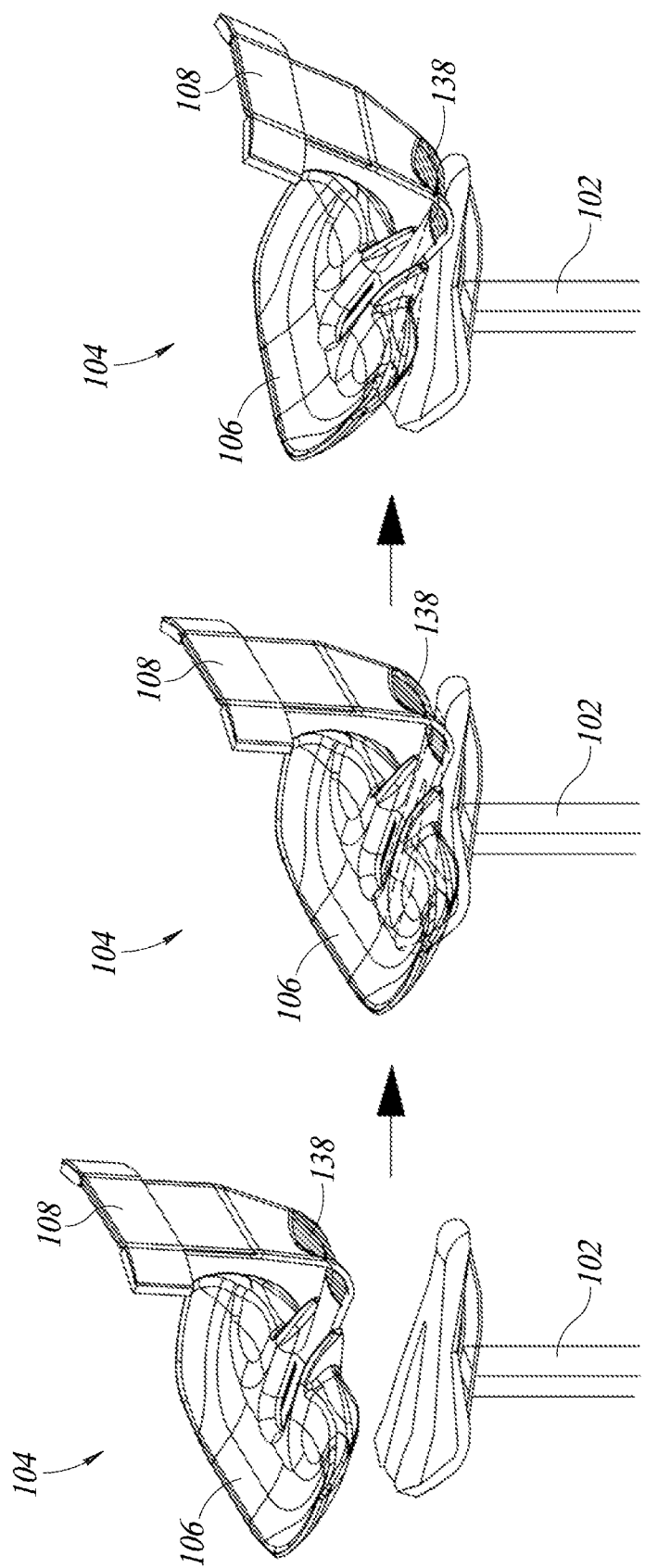
FIG. 5 is zoomed in views directed to the support portion and the saddle contact portion of the embodiment of the harness as shown in FIGS. 1A, 1B, 2A-2G, 3A-3C, and 4 contacting a saddle of the bicycle.

FIG. 5 is zoomed in views directed to the support portion 106 and the saddle contact portion 108 of the embodiment of the harness 104. The bicyclist 100 is not shown in FIG. 5 such that the saddle contact portion and the support portion 108 are more readily viewable. The left-hand side image in FIG. 5 represents the positioning of the harness 104 as the bicyclist 100 is about to sit on the saddle 103 of the bicycle 102. The center image in FIG. 5 represents the positioning of the harness 104 when the bicyclist is sitting on the saddle 103 of the bicycle 102. The right-hand side image in FIG. 5 represents the bicyclist 100 is leaning forward when riding the bicycle 100 and resting their forearms on the handlebars of the bicycle 102. The right-hand side image in FIG. 5 is the same or similar to the positioning of the harness 104 as illustrate in the right-hand side image in FIG. 4.

Figure 6:
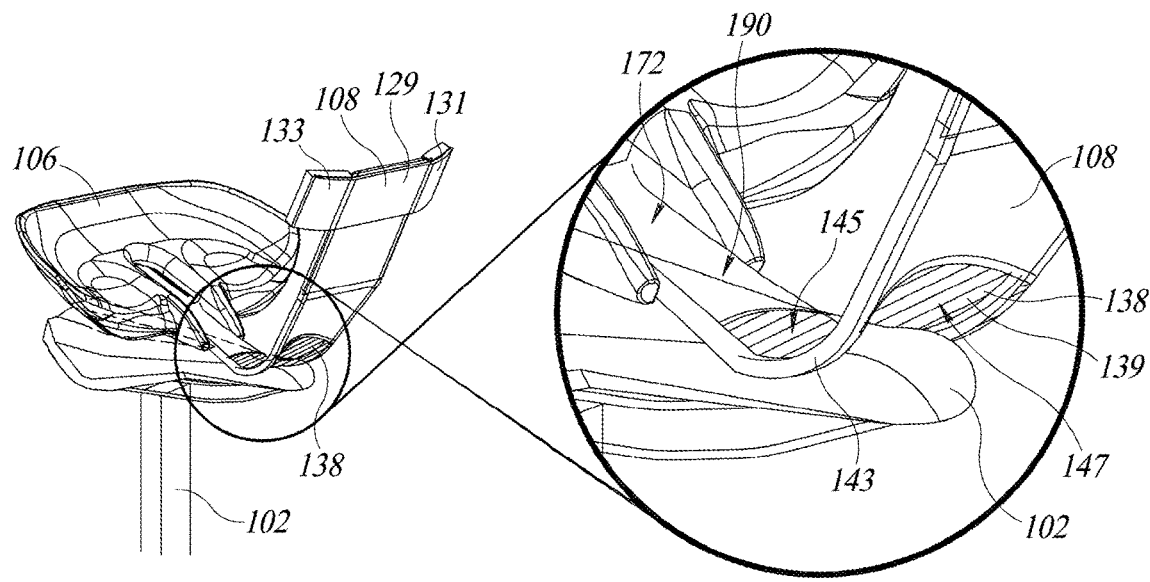
FIG. 6 is a zoomed in view directed to the support portion and the saddle contact portion of the harness as shown in FIGS. 1A, 1B, 2A-2G, 3A-3C and 4 contacting the saddle of the bicycle.

FIG. 6 is a zoomed in view directed to the lower contact portion 138 of the support portion 108 of the harness 104. The left-hand side image in FIG. 6 is a reproduction of the right-hand side image in FIG. 5.

When the bicyclist 100 is in the forward leaning position in which the bicyclist's 100 forearms are on the handlebars of the bicycle 102, the exterior surface 147, which is concave or curved, of the middle portion 139 becomes the point of contact between the harness 104 and the saddle 103 of the bicycle 102. The exterior surface 147 contacts the forward portion of the saddle 103, which is narrower than the rear portion of the saddle 103 of the bicycle 102. The forward portion of the saddle 103 is positioned between the legs of the bicyclist 102 when the bicyclist 102 is sitting on the saddle 103. When the harness 104 is in this position as shown in FIG. 6, the saddle contact portion 106 is raised above the saddle 103 of the bicycle 102 such that the saddle contact portion 106 does not contact the saddle 103 of the bicycle 102.

When the bicyclist 100 is leaning either to the left or right based on the orientation of the bicycle 102, the exterior surface, which is concave or curved, of the middle portion 139 becomes the point of contact between the harness 104 and the saddle 103 of the bicycle. The exterior surface 147 contacts the forward portion of the saddle 103, which is narrower than the rear portion of the saddle 103 of the bicycle 102. The exterior surface 147 may rotate about the forward portion of the saddle 103 when the bicyclist 100 leans to the left or the right to lean the bicycle 102. For example, when the bicyclist 100 is riding the bicycle 102, the bicyclist 100 may utilize the exterior surface 147 of the harness 104 to apply a force to the forward portion of the saddle 103 caused by the bicyclist 100 leaning laterally with or against the saddle to assist in leaning or laterally moving (e.g., rotating) the bicycle 102. When the bicyclist is turning to the right, the bicyclist may laterally lean to the right to assist in turning to the right more quickly. Alternatively, if the bicycle 102 begins to fall over to the right while the bicyclist 100 is riding the bicycle 102, the bicyclist 100 may laterally lean to the left to assist in avoiding the bicycle 102 from falling over and crashing.

When the harness 104 is in this position due to the leaning of the bicyclist 100 while riding the bicycle 102, little to no pressure is applied to the perineum area 151 for the same or similar reasons as discussed earlier within the present disclosure. Accordingly, for the sake of simplicity and brevity of the present disclosure, the description of the interaction between the harness 104 and the perineum area 151 will not be reproduced here.

When the harness 104 is in this position due to the leaning of the bicyclist 100 while riding the bicycle 102, the pressure applied at this point of contact to the exterior surface 147 of the middle portion 139 of the lower contact portion 138 is distributed across the front side of the bicyclist 100. For example, when the bicyclist 100 is leaning forward, the bicyclist 100 leans against the extension portions 131, 133 and the body portion 129 of the support portion 108, which distribute the pressure across the front side of the bicyclist. The extension portions 131, 133 and the body portion 129 of the support portion 108 distribute the pressure at the point of contact along the waist, hips, stomach, or other points along the front side of the bicyclist.

This distribution of the pressure at the point of contact between the exterior surface 147 of the middle portion 139 of the lower contact portion 138 reduces the accumulation of fatigue in the bicyclist 100 as compared to when the bicyclist 100 is not wearing the harness 104. For example, if the bicyclist 100 was not wearing the harness 104, the perineum area 151 would be the main point of contact with the saddle when the bicyclist 100 was leaning forward with their forearms resting on the handlebars of the bicycle 102. As the perineum area 151 would be the main point of contact, all of the pressure would be applied as an intense pressure point to the perineum area 151 of the bicyclist. This pressure point applied to the perineum area 151 would increase the accumulation of fatigue in the bicyclist 100 as the bicyclist 100 continued to ride the bicycle 102 while leaning forward with their forearms resting on the handlebars of the bicycle 102.

The bicyclist 100 would lean forward in the manner as discussed above with their forearms resting on the handlebars of the bicycle 102 to decrease the bicyclists overall surface area that contacts wind or air to reduce drag. In other words, by leaning forward in this manner, the bicyclist 100 is more aerodynamic as compared to when the bicyclist was leaning less forward and sitting more upright while riding the bicycle 102. For example, in at least one situation, the bicyclist may lean forward to improve the bicyclist's balance while riding the bicycle 102 such as during an uphill ascent.

Figure 7:
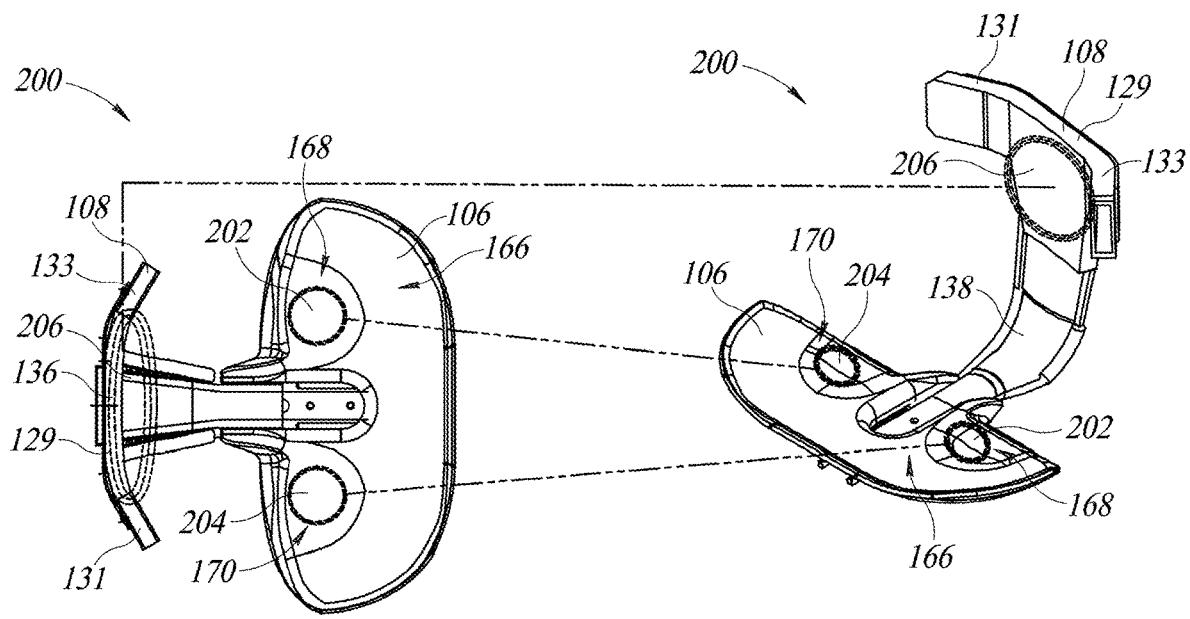
FIG. 7 is directed to an alternative embodiment of a harness of the present disclosure.
Figure 8:
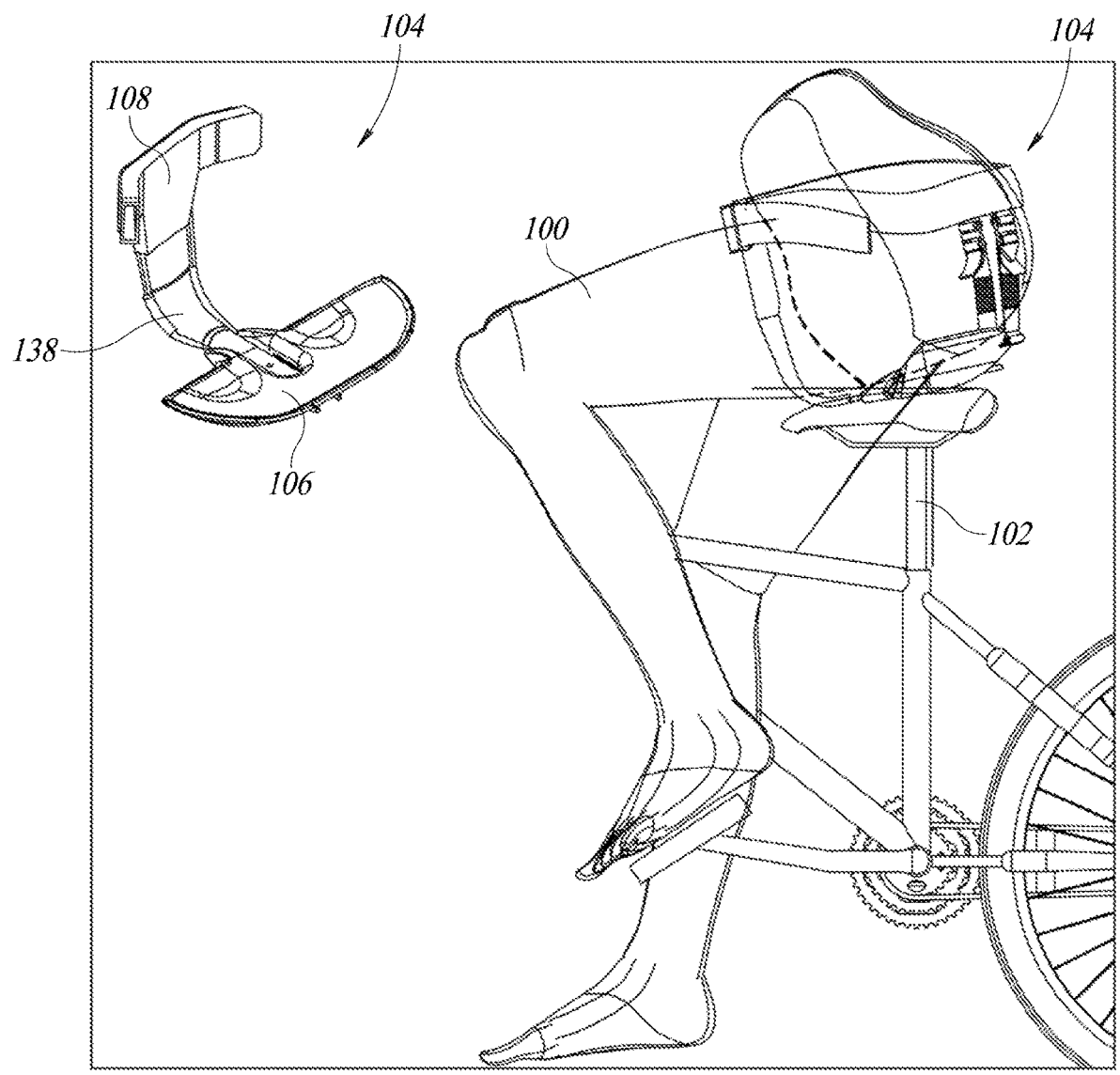
FIG. 8 is directed to a bicyclist wearing the embodiment of the harness as shown in FIGS. 1A-1C, 2A-2G, 3A-3C, 4, 5, and 6.

FIG. 7 is directed to an alternative embodiment of a harness 200. The left-hand side image in FIG. 7 is a top side view of the harness 200. The right-hand side image in FIG. 7 is a perspective view of the harness 200. However, the adjustable straps 110, 112, 114 have been omitted for clarity of the saddle contact portion 106 and the support portion 108.

The harness 200 has features that are the same or similar to the features of the harness 104. The same or similar reference numerals of the features of the harness 104 will be utilized for the same or similar features of the harness 200. For the sake of simplicity and brevity of the present disclosure, the description of these same or similar features between the harness 104 as shown in FIGS. 2A-2G and the harness 200 as shown in FIG. 7 will not be reproduced here. However, different or additional features of the harness 200 as compared to the harness 104 will be discussed in greater detail here.

The harness 200 includes a first, second, and third cushion 202, 204, 206. The first cushion 202 is on the second concave surface 168, the second cushion 204 is on the third concave surface 170, and the third cushion 206 is on an interior surface of the support portion 108. The third cushion 206 is on an interior surface of the body portion 129. In some embodiments, the third cushion 206 may be on the interior surface of the body portion 129, on an interior surface of the first extension portion 131, and on an interior surface of the second extension portion 133. The first, second, and third cushions 202, 204, 206 may be made of a soft material to provide additional cushioning to improve the comfort of the bicyclist 100 when the bicyclist 100 is riding the bicycle 102 while wearing the harness 104. The cushions 202, 204, 206 are generally positioned at points on the harness 200 as shown in FIG. 7 as these are the points of contact generally at which the bicyclist 100 will contact the harness 200 when riding the bicycle 102. These cushions 202, 204, 206 at these points will assist in distributing a weight of the bicyclist across the harness 200 evenly to avoid pressure points between the harness 200 and the bicyclist 100 while riding the bicycle 102. The cushions 202, 204, 206 are substantially circular in shape. However, it will be readily appreciated that the orientation, position, size, and shape of the cushions 202, 204, 206 may be adjusted or customized for the bicyclist 100.

In some alternative embodiments, the first, second, and third cushions 202, 204, 206 as shown in FIG. 7 may have different shapes and sizes. Instead, the cushions may be substantially rectangular, ovular, triangular, or some other type of three-dimensional shape. By way of another example, the cushions 202, 204, 206 may be manufactured to have a custom-shape or size mimicking and conforming to the curvature and shape of the bicyclist 100. The customizable and adjustability of the cushions 202, 204, 206 improves the bicyclist's 100 riding experience by increasing comfort, reducing strain while riding the bicycle 102, and reducing pain and discomfort after riding the bicycle 102 for extended periods of time.

In some alternative embodiments, the first, second, and third cushions 202, 204, 206 may be positioned differently than as shown in FIG. 7. For example, the positioning of the cushions 202, 204, 206 may be adjusted or customized such that the cushions 202, 204, 206 are positioned in a different orientation and position as shown in FIG. 7. The adjustments or customization of the orientation and positioning of the cushions 202, 204, 206 specifically for the bicyclist 100 may further improve support of the bicyclist 100 and reduction of pressure points while the bicyclist 100 rides the bicycle 102.

In some alternative embodiments, there may be more cushions than the first, second, and third cushions 202, 204, 206. In yet some other alternative embodiments, there may be fewer cushions than the first, second, and third cushions 202, 204, 206.

In other words, the cushions 202, 204, 206 as shown in FIG. 7 may be adjusted in size and shape as well as orientation and positioning on the harness 200 such that a riding experience of the bicyclist is as comfortable and painless as possible by reducing and reliving pressure points. In other words, as set forth earlier, the cushions 202, 204, 206 may be a custom size and shape for the bicyclist 100 as well as the orientation and positioning may be customized for the bicyclist 100 to provide the bicyclist 100 a custom fit while wearing the harness 200. The custom fit may further improve the bicyclist's riding experience at least by increasing comfort, reducing strain while riding the bicycle 102, and reducing and relieving pain and discomfort, which may have been a result of pressure points, after riding the bicycle 102 for extended periods of time.

In view of the discussion within the present disclosure, various embodiments and implementations of harnesses are described herein and provide cushioning, padding, and support to a bicyclist 100. These embodiments of the harness as discussed are configured to be worn over external clothing of the bicyclist and provide a comfortable riding experience while reducing the likelihood of injuries, reducing pressure points, reducing stress, reducing pain, and reducing the speed at which fatigue is accumulated when the bicyclist is riding the bicycle. The reduction of these factors improves the bicyclists riding experience and increases the time and distance of which the bicyclist may ride their bicycle. This increases the likelihood of the bicyclist being able to ride the bicycle along farther routes without being uncomfortable or becoming exhausted too quickly such that the bicyclist cannot complete their ride.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A harness, comprising:
   a saddle contact portion including a first reception portion and a second reception portion;
   a support portion;
   a first member in the first reception portion and coupled to the support portion;
   a second member in the second reception portion and coupled to the support portion;
   a first adjustable strap having a first end coupled to the saddle contact portion and a second end opposite to the first end;
   a second adjustable strap having a first end coupled to the saddle contact portion and a second end opposite to the first end; and
   a third adjustable strap coupled to the second ends of the first and second adjustable straps, the third adjustable strap including a first end and a second end opposite to the first end, the first and second ends configured to be coupled to the support portion.

2. The harness of claim 1, wherein:
   the third adjustable strap further includes a first male component at the first end of the third adjustable strap, and a second male component at the second end of the third adjustable strap;
   the support portion further includes:
      a first female reception component at a first side of the support portion, the first female reception component receives the first male component; and
      a second female reception component at a second side of the support portion opposite to the first side, the second female reception component receives the second male component.

3. The harness of claim 1, wherein the saddle contact portion further includes a first posterior contact indentation and a second posterior contact indentation.

4. The harness of claim 3, wherein the first and second posterior contact indentations are concave surfaces.

5. The harness of claim 3, wherein the saddle contact portion further includes a channel between the first posterior contact indentation and the second posterior contact indentation, the channel separating the first posterior contact indentation from the second posterior indentation.

6. The harness of claim 1, further comprising a mounting component holding the first and second reception members in a stationary position within the first and second reception portions of the saddle contact portion.

7. The harness of claim 6, wherein:
   the mounting component includes a first end and a second end opposite to the first end;
   the first member includes a plurality of first teeth, ones of the plurality of first teeth interlock with the first end and the second end of the mounting component; and
   the second member includes a plurality of second teeth, ones of the plurality of second teeth interlock with the first end and the second end of the mounting component.

8. The harness of claim 1, wherein the saddle contact portion has an outer surface including a first convex surface and a second convex surface.

9. The harness of claim 8, wherein the first convex surface and the second convex surface extend away from the channel.

10. The harness of claim 9, wherein the first convex surface and the second convex surface of the harness contact a saddle of a bicycle that supports a rider wearing the harness while riding the bicycle.

11. The harness of claim 1, further comprising an opening positioned between the support portion and the saddle contact portion, the opening spacing the support portion from the saddle contact portion.

12. The harness of claim 11, wherein the opening is positioned between the first member and the second member.

13. The harness of claim 11, wherein the opening configured to align with a perineum area of a rider when the rider is wearing the harness.

14. A harness, comprising:
   a saddle contact portion including:
      a first reception portion in the saddle contact portion;
      a second reception portion in the saddle contact portion;
   a support portion;
   a first rod component coupled to the support component, the first rod component including a plurality of first teeth; and
   a locking component coupling the first rod component to the saddle contact portion, the locking component interlocks with the plurality of teeth holding the first rod component and the support component in a first stationary position.

15. The harness of claim 14, further comprising:
   a second rod component coupled to the support component, the second rod component including a plurality of second teeth, wherein the locking component interlocks with the plurality of second teeth holding the second rod component in the first stationary position; and
   an opening positioned between the support portion and the saddle contact portion spacing the support portion from the saddle contact portion, the opening is positioned between the first rod component and the second rod component, and the opening configured to align with a perineum area of a rider when the rider is wearing the harness.

\* \* \* \* \*